April 7, 1959    H. U. BRUECKNER ET AL    2,880,555
LENS GRINDING APPARATUS
Filed May 31, 1955      11 Sheets—Sheet 5
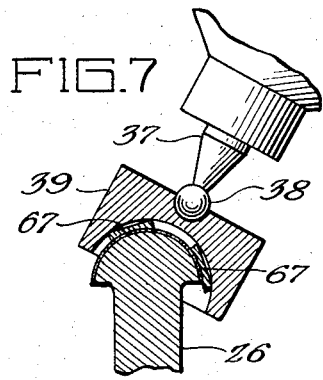
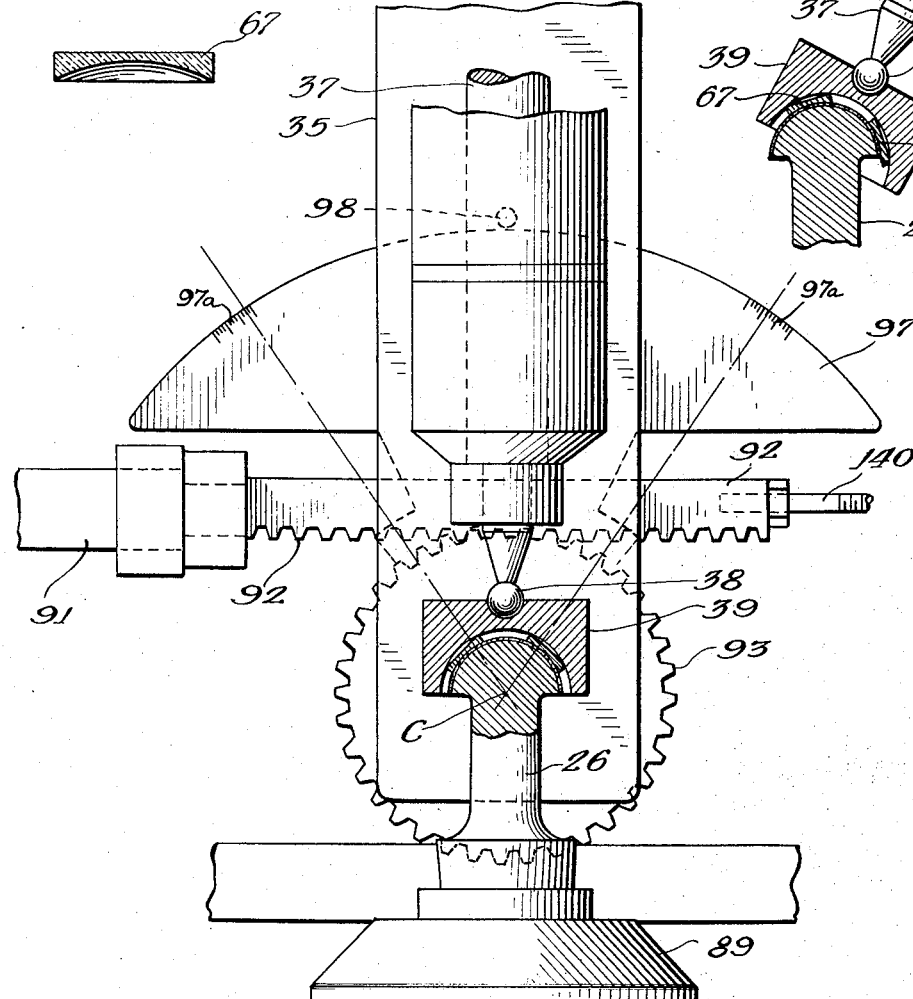
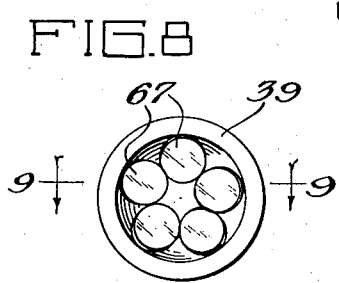
Inventors:
Hubert U. Brueckner
Edward E. Fluskey
Fred Pellar
John L. Ptaszek
By: Zabel, Baker, York, Jones & Gathman Attorneys April 7, 1959 H. U. BRUECKNER ET AL 2,880,555
LENS GRINDING APPARATUS
Filed May 31, 1955 11 Sheets-Sheet 6
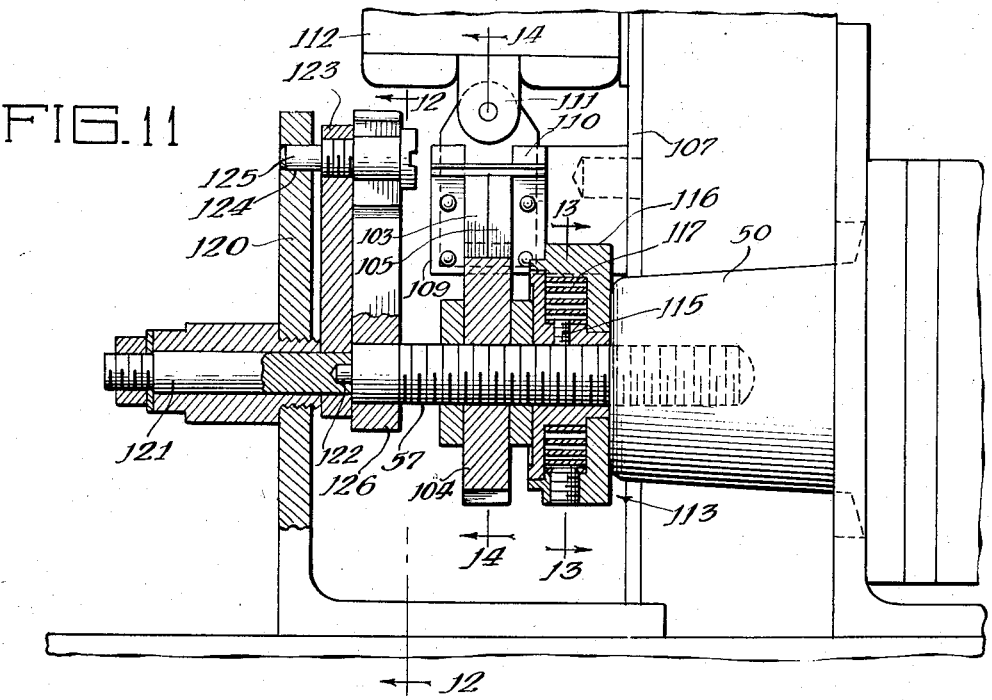
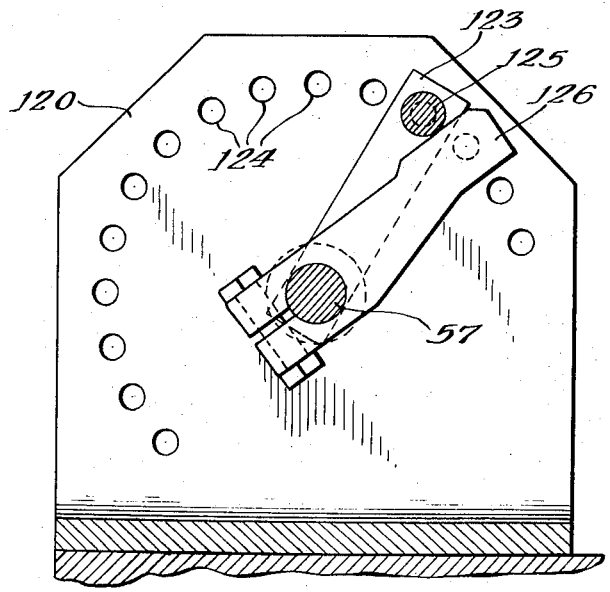
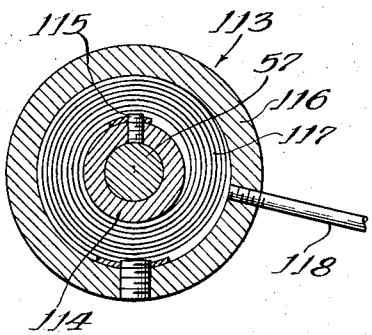
Inventors:
Hubert U. Brueckner
Edward E. Fluskey
Fred Pettar
John L. Ptaszek
By: Zabel, Baker, York,
Jones & Dithmar
Attorneys April 7, 1959 H. U. BRUECKNER ET AL 2,880,555
LENS GRINDING APPARATUS
Filed May 31, 1955 11 Sheets-Sheet 7
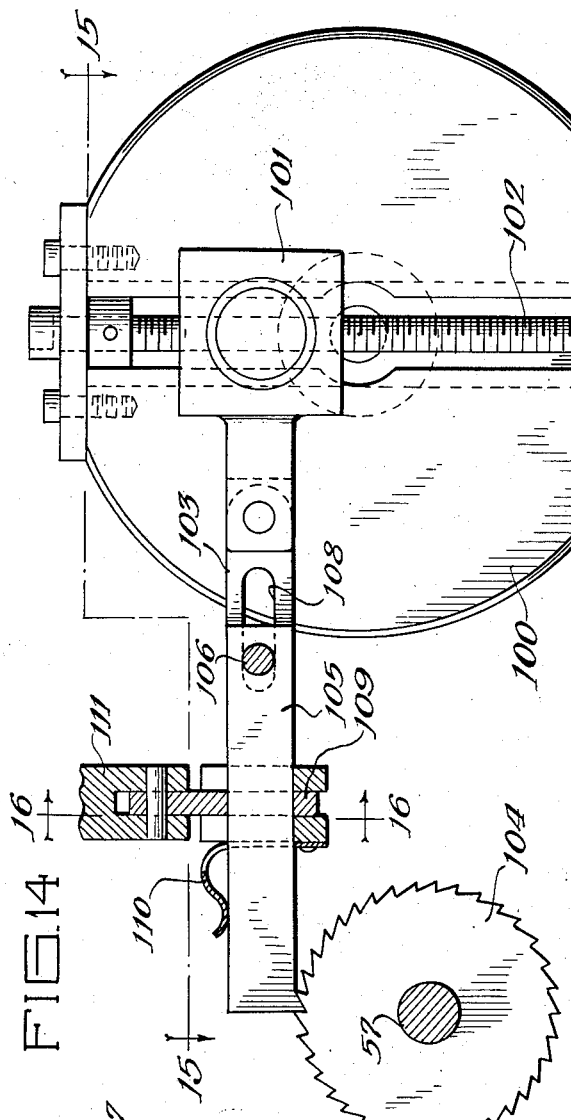
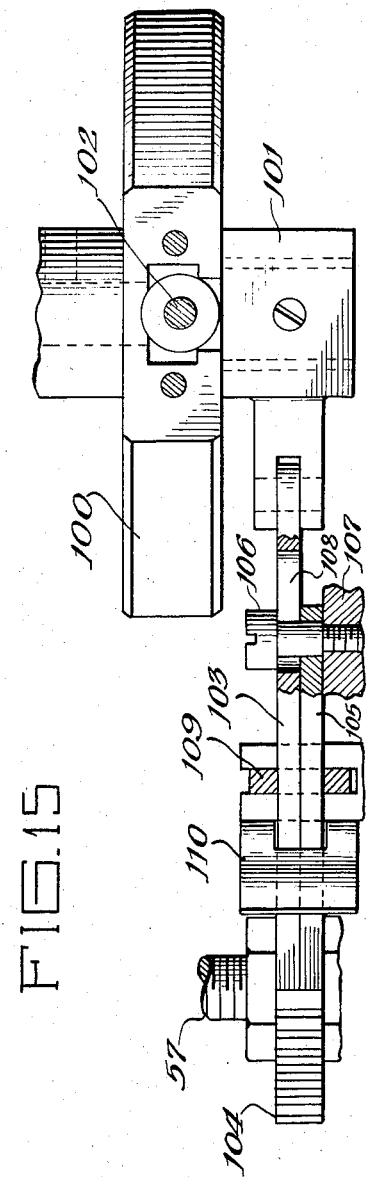
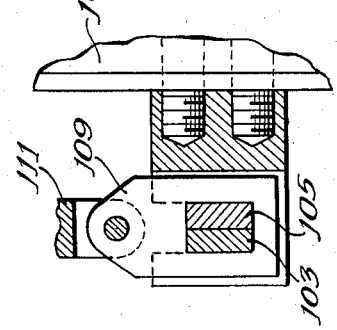
Inventors:
Hubert U. Brueckner
Edward E. Fluskey
Fred Pellar
John L. Ptaszek
By: Zabel, Baker, York,
Jones & Dithmar
Attorneys

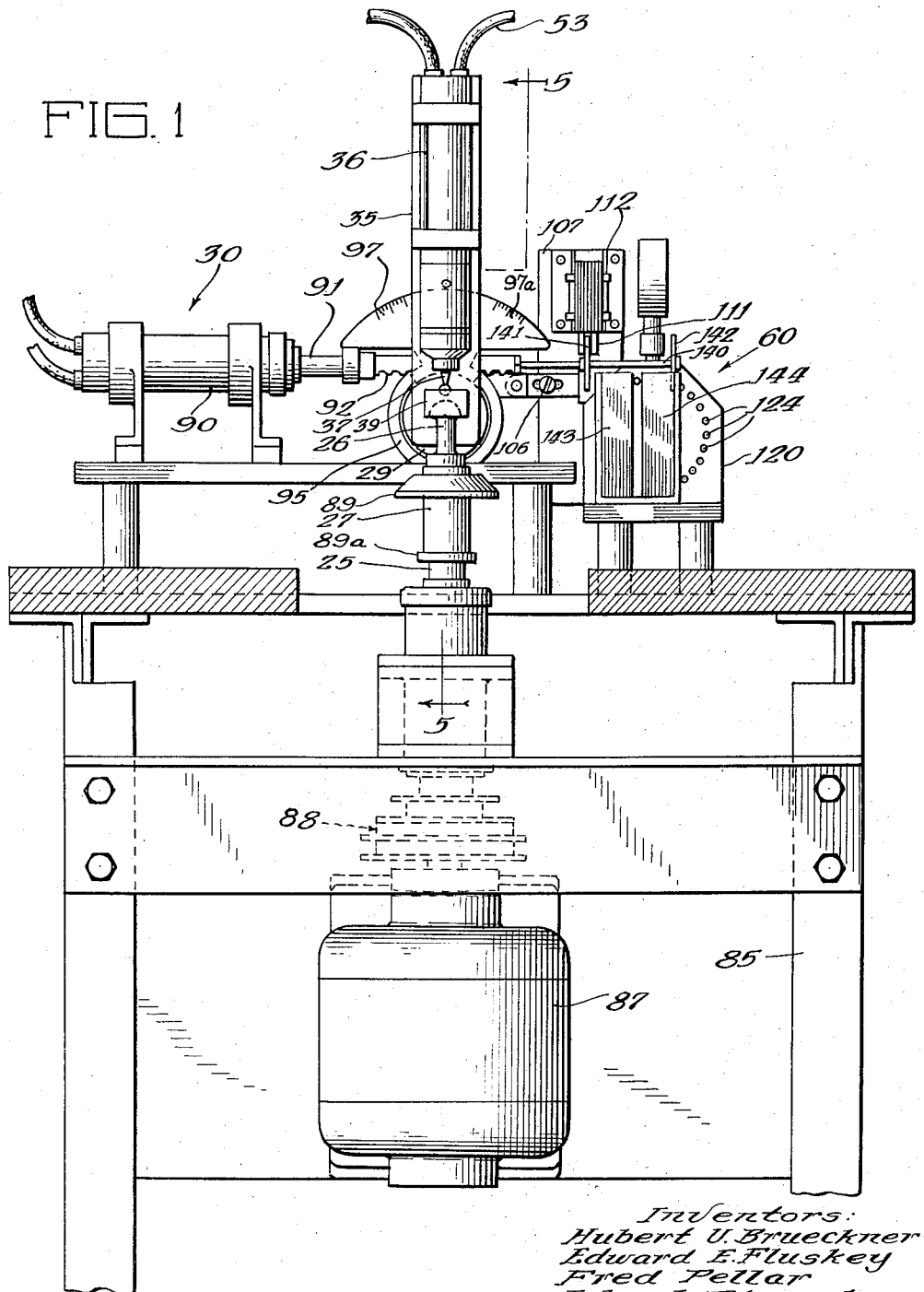

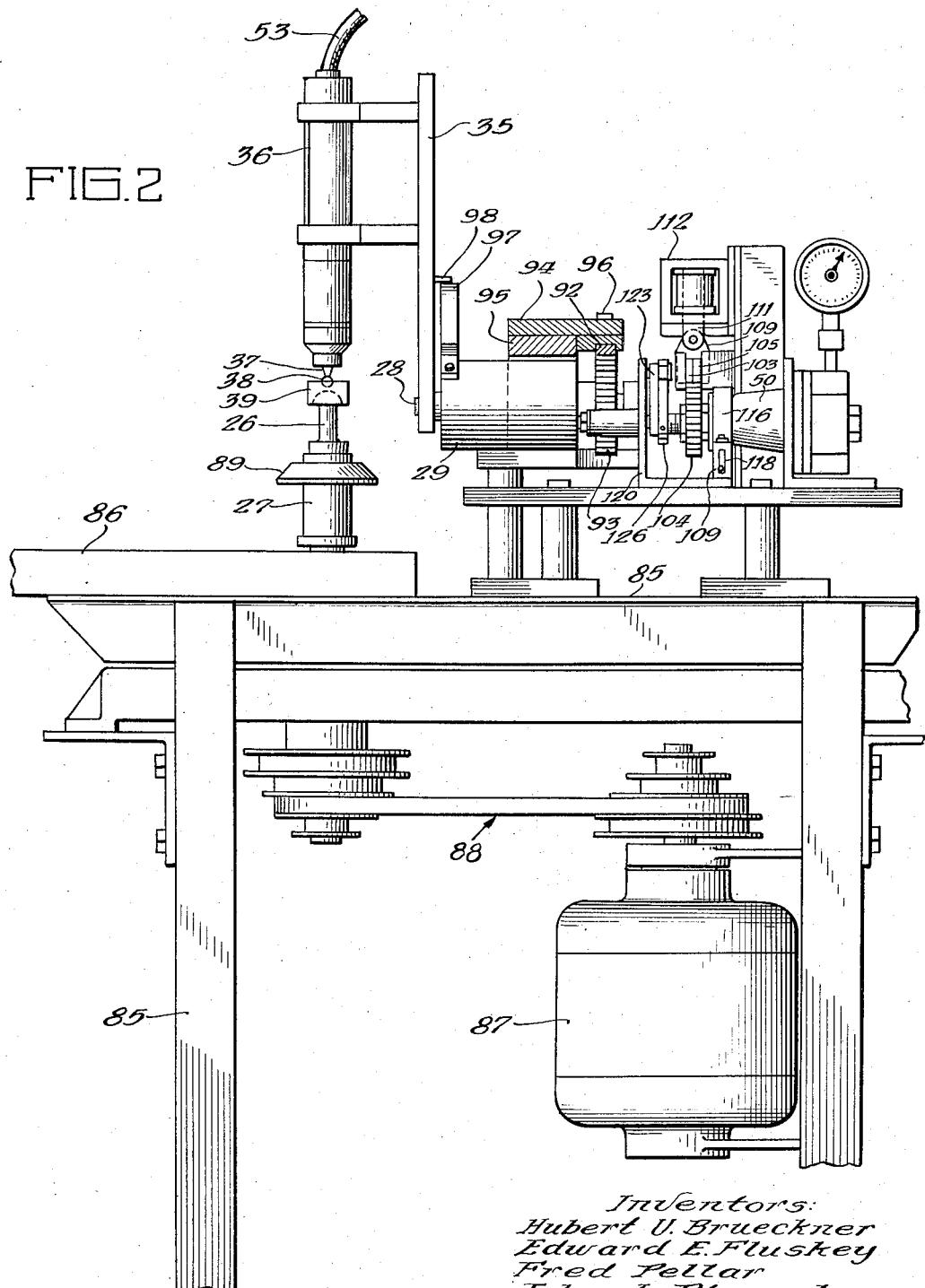

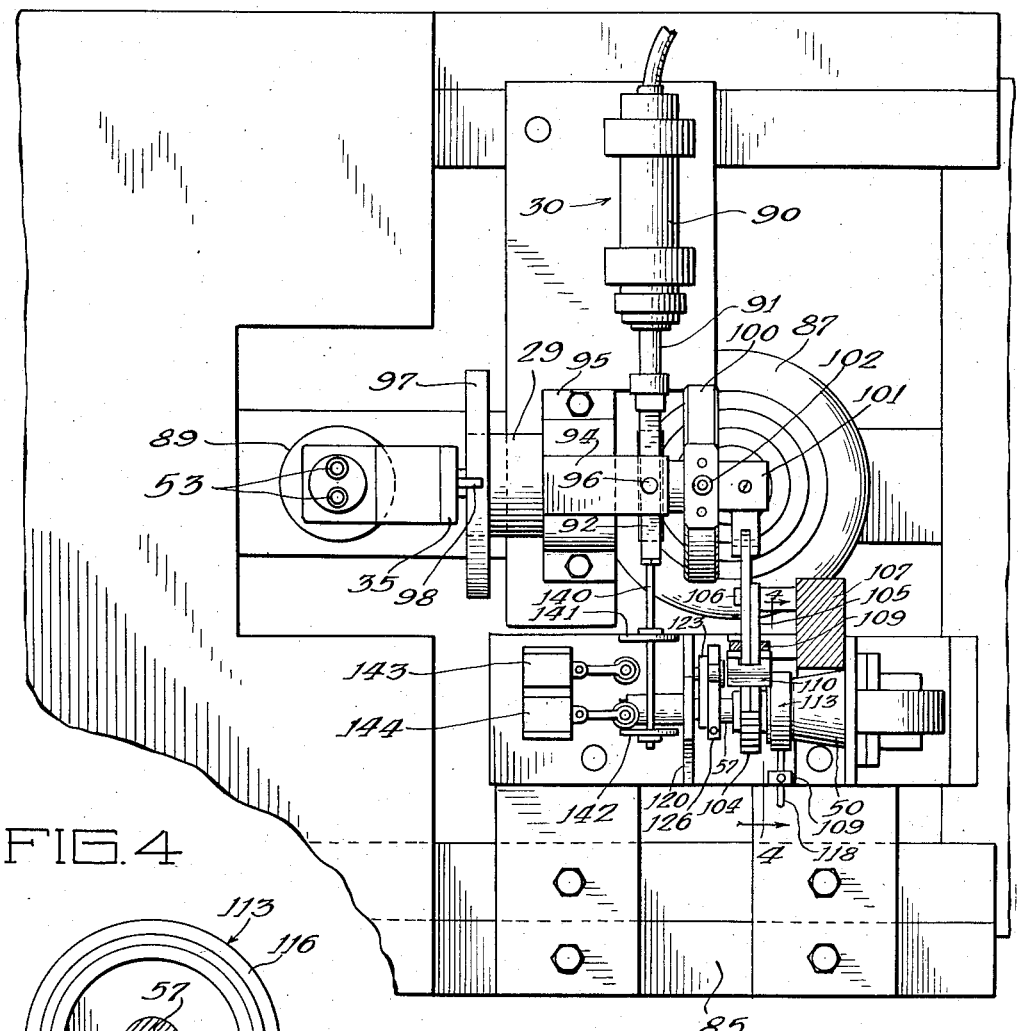
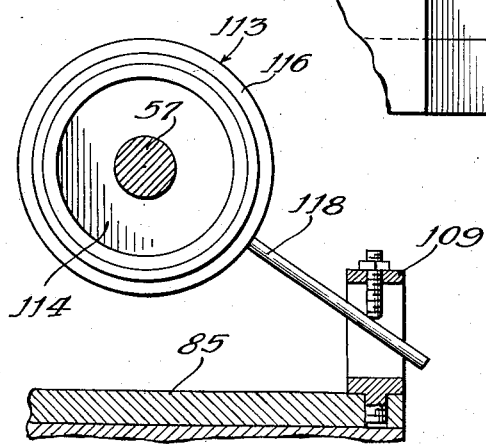

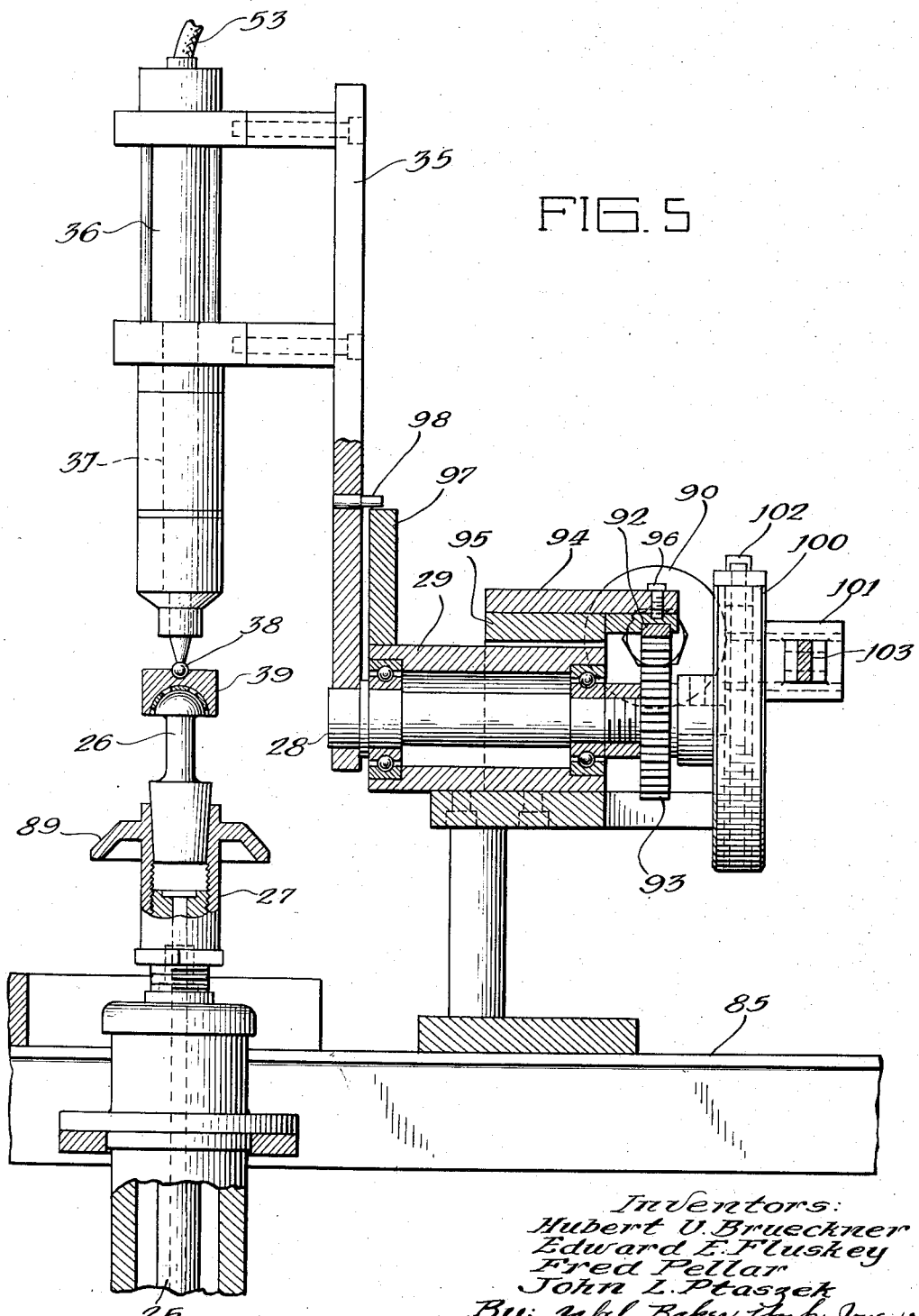

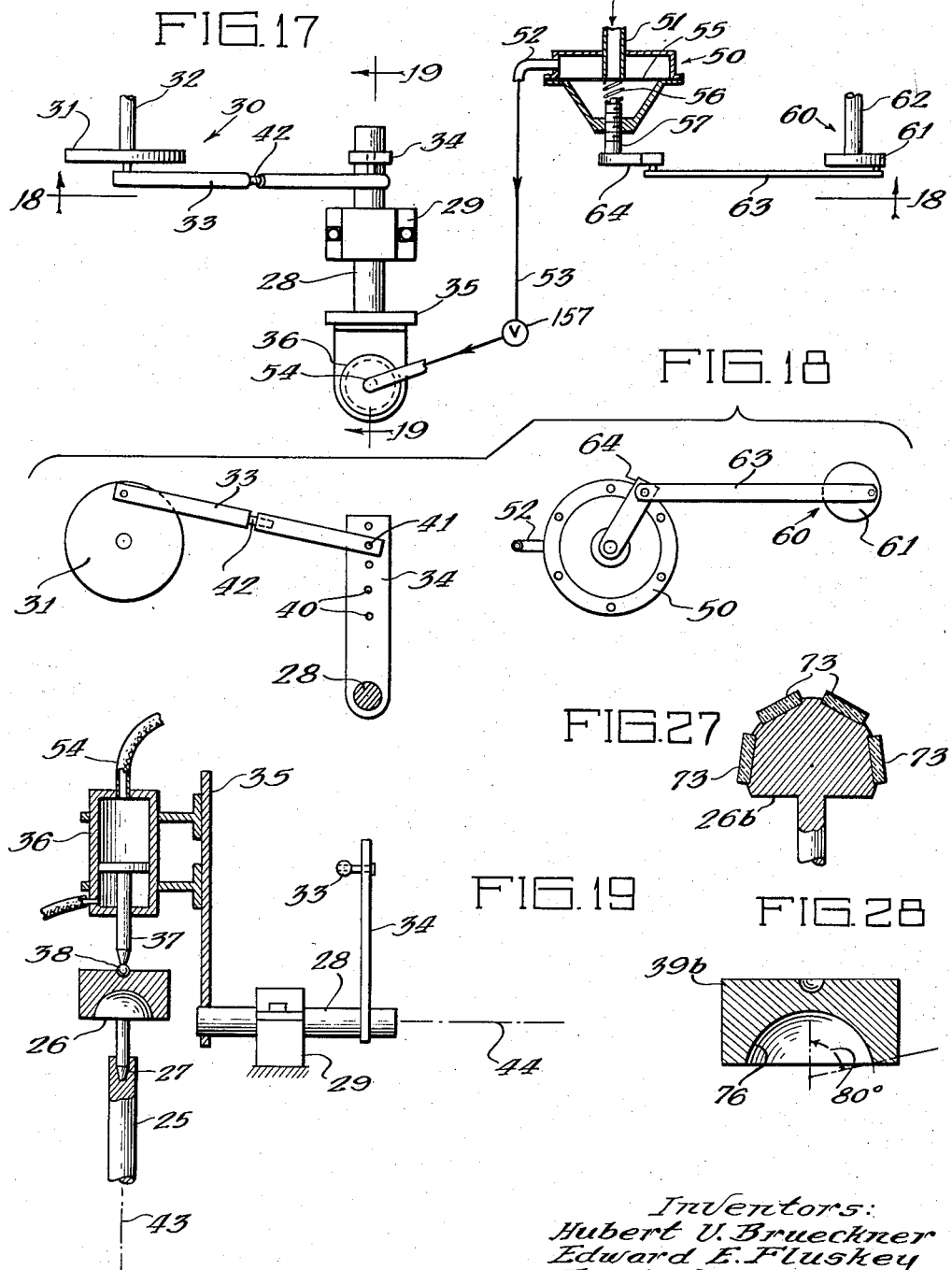

April 7, 1959 H. U. BRUECKNER ET AL 2,880,555
LENS GRINDING APPARATUS
Filed May 31, 1955 11 Sheets-Sheet 9
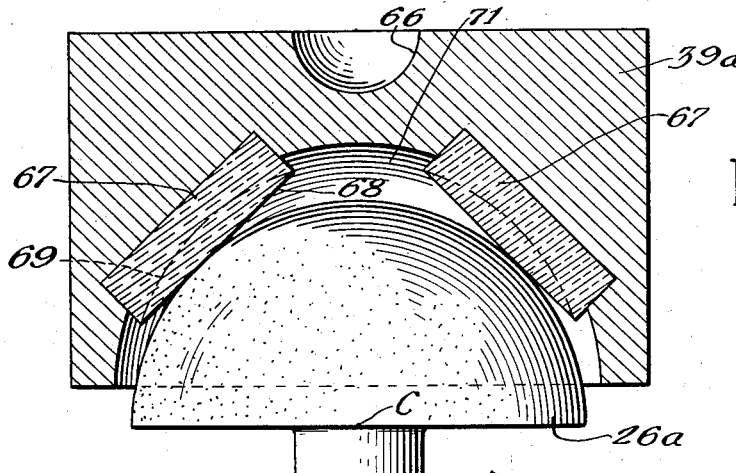
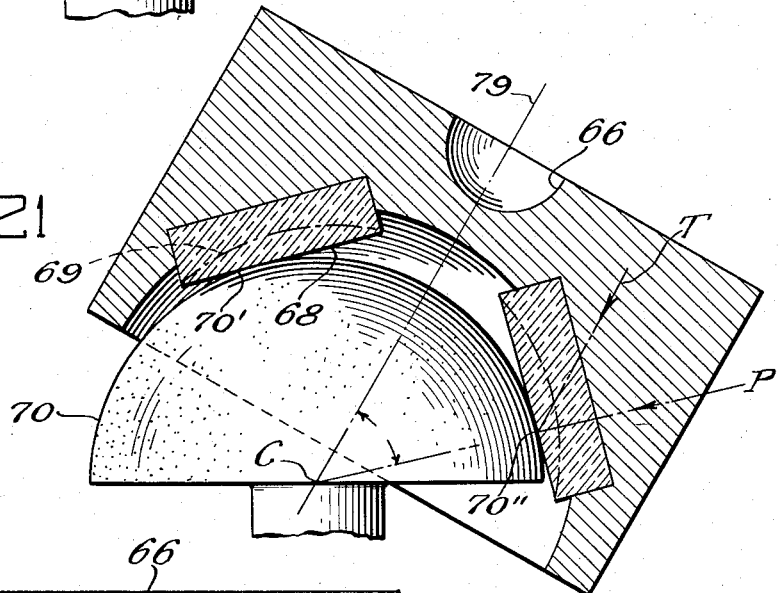
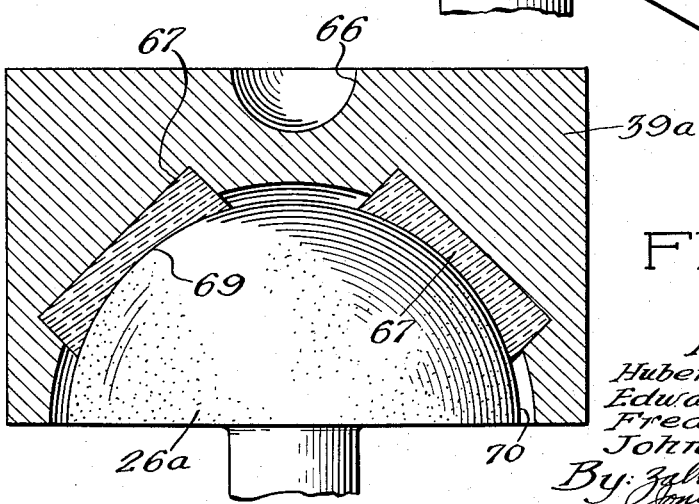
Inventors:
Hubert U. Brueckner
Edward E. Fluskey
Fred Pellar
John L. Ptaszek
By Zabel, Baker, Fink,
Jones & Githler
Attorneys

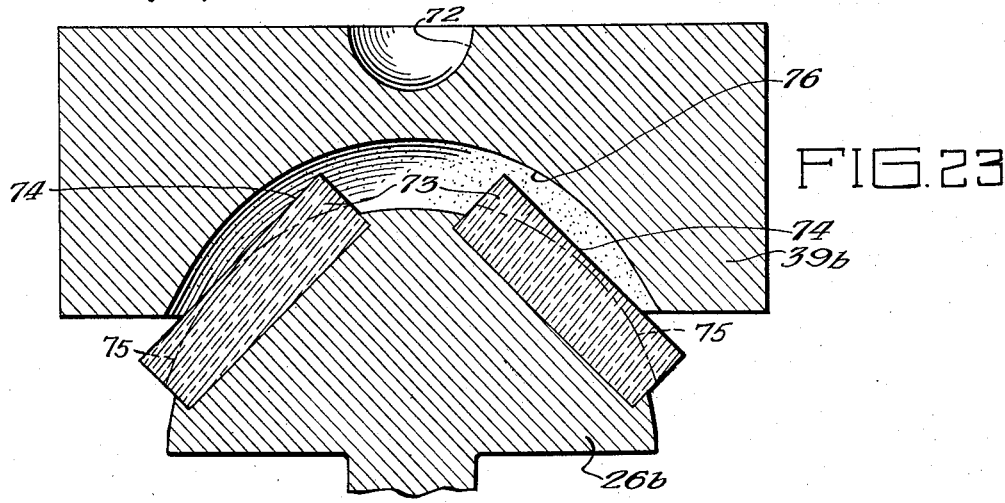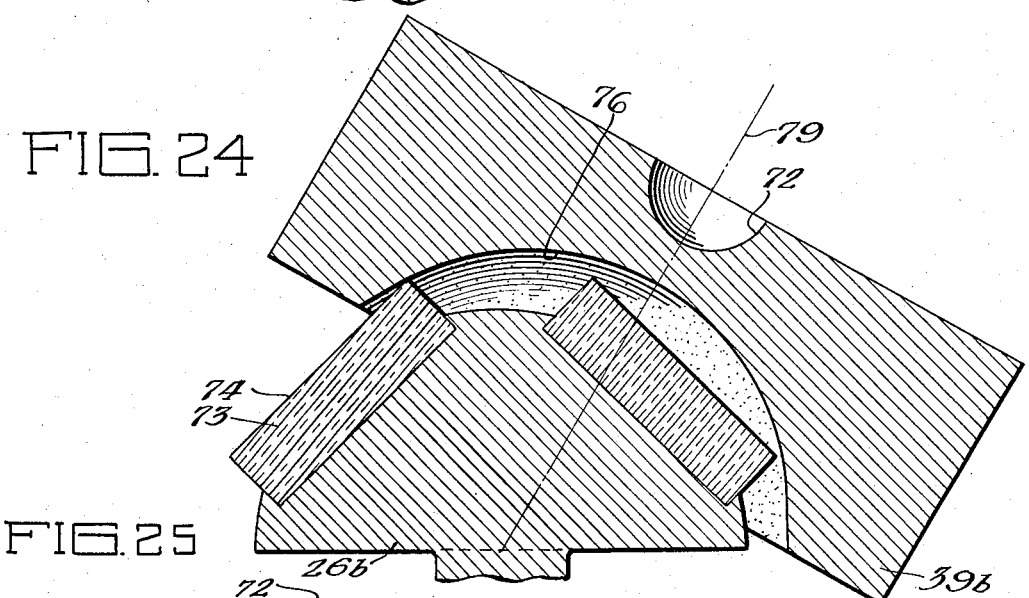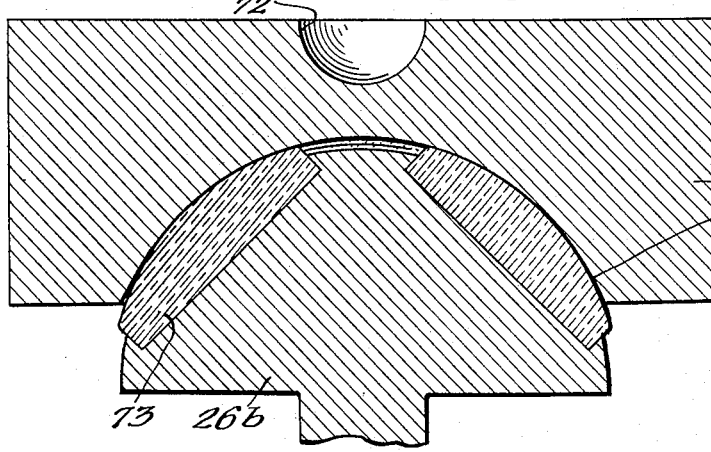

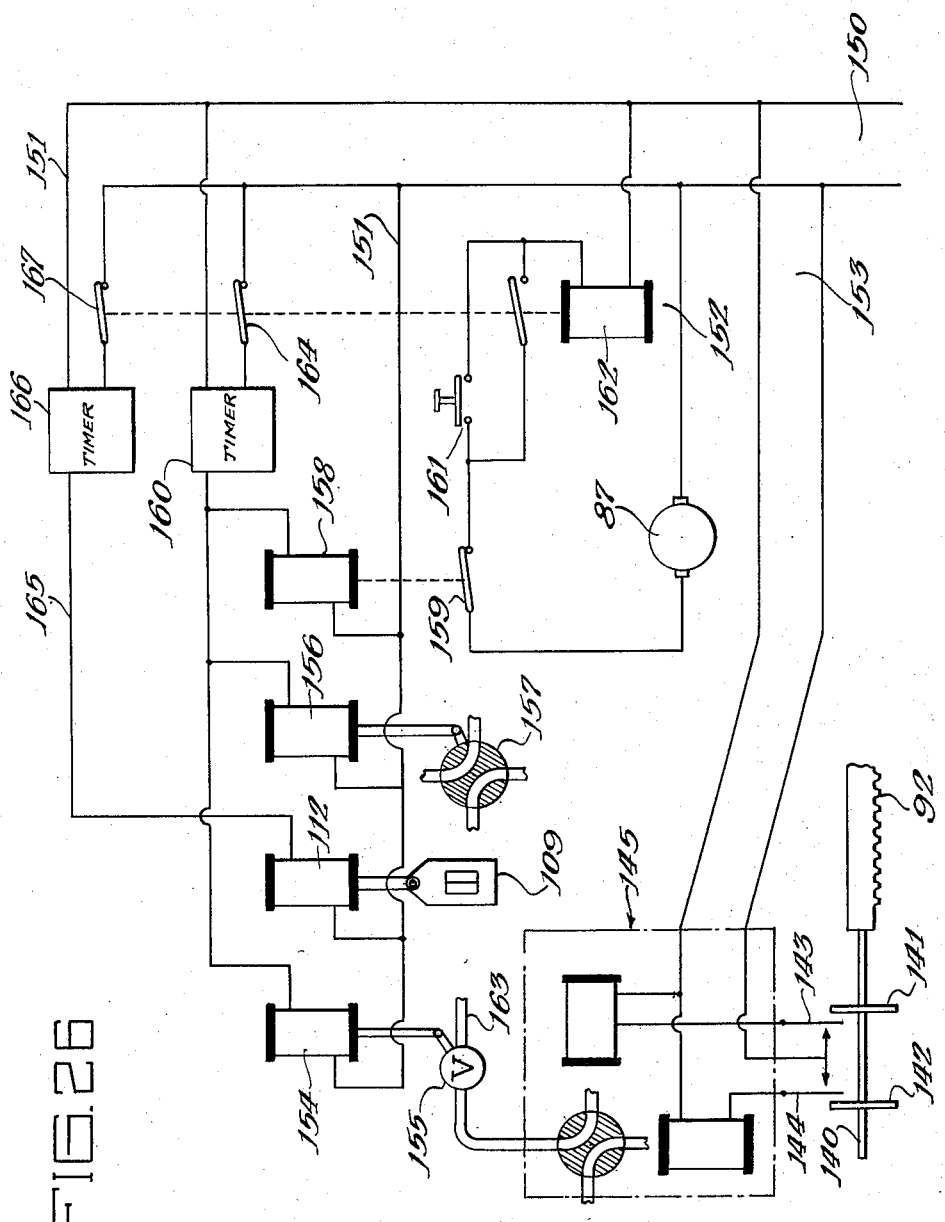

United States Patent Office 2,880,555
Patented Apr. 7, 1959

2,880,555

LENS GRINDING APPARATUS

Hubert U. Brueckner, Lombard, Edward E. Fluskey, Oak Park, and Fred Pellar and John L. Ptaszek, Chicago, Ill., assignors to Revere Camera Company, Chicago, Ill., a corporation of Delaware Application May 31, 1955, Serial No. 511,893

15 Claims. (Cl. 51—55)

The present invention relates to an improved method for grinding lenses, and to an improved lens grinding apparatus.

The usual process employed in the grinding of lens is a lapping process, which is characterized by the use of loose abrasives. It is necessary to conduct this operation in a series of separate steps, characterized by the use of progressively finer abrasives, and by the use of a series of laps of progressively increasing curvature (in the case of a convex lens). Since the abrasive for grinding action is as effective in wearing away the lap as it is in grinding the lens, the lapping operation requires operators of exceedingly great skill in order to produce lenses of the desired curvature, and in order to maintain the laps in proper condition.

The main objective of the grinding operation, in the camera lens art for example, is to produce a lens which is within the required tolerance, such as five fringes of the perfect shape as determined by a test glass. The amount of glass removed incident to the polishing operation brings the finished lens to within one fringe or less of the desired shape.

In the grinding of spherical lenses, it has been proposed to substitute a grinding operation for certain of the steps of the lapping operation. However, the means heretofore proposed, known as a curve generator, is not physically able to generate consistently a true spherical surface. Therefore, a curve generator is an effective substitute only for the first, or first and second lapping steps.

A lens is frequently ground from a flat blank. Due to the amount of material which must be removed when a flat blank is used, the first lapping operation is unduly prolonged. Furthermore, due to the very present danger of edge chipping, the first lapping operation cannot very well be performed on a lapping machine, as in the case of molded blanks, but on the contrary, each blocker is individually lapped by hand. Therefore, the curve generator is of particular utility as a substitute for the first lapping operation, when the lens is ground from a flat blank, and this is the case in spite of its other disadvantages. It can be pointed out that a grinding operation is inherently more rapid than a lapping operation, although this rapidity in a curve generator is partially offset by the fact that commercially available devices often operate only on a single lens at a time, rather than on a set of blocked lens.

It is an object of the present invention to provide a lens grinding method and apparatus which is capable of producing in a lesser number of operations and without the special skill required by a lens technician a lens which has the required accuracy of curvature. In other words, the present invention is an effective substitute for some of the lapping operations outlined above.

A further object is to provide a lens grinding method and apparatus which operates by a grinding action, and which is not subject to the disadvantages and inherent limitations of the curve generator.

A still further object is to provide an improved lens grinding method and apparatus in which the motion of the parts is such to avoid what may be called a "repeating pattern" which leads to zoning or scratches in the finished product.

A still further object is to provide an improved lens grinding method and apparatus which is characterized by such control of the grinding pressure as will avoid chipped edges and cracking, even when grinding a flat blank.

Still another object is to provide an improved method and apparatus for grinding lens which is characterized by a grinding operation rather than by a lapping operation, and which contemplates the use of a grinding wheel, such as a diamond wheel, and which further is designed so that the wear of the diamond wheel will be evenly distributed to the end that it will maintain its shape so that a true spherical surface may be generated.

A still further object is to provide an improved grinding apparatus and method of the type indicated in which one of the cooperating elements or tools is so supported that inaccuracies, within manufacturing tolerances, in the alignment of the machine elements will not cause a corresponding inaccuracy in the finished lens.

In this connection, it can be pointed out that in the case of a curve generator, it is not possible to secure a perfect spherical surface unless the axes of two spindles are disposed in exactly the same plane, and unless the axes intersect at a given point. It is not physically possible to provide this relationship, since machine tolerances are of an entirely different order than the tolerances on finished lens.

Other objects, features and advantages will appear as the description proceeds.

With reference now to the drawings in which like reference numerals designate like parts:

Fig. 1 is a front elevation of a preferred embodiment of our invention;

Fig. 2 is a side elevation of Fig. 1, but partly in section;

Fig. 3 is a plan view, partly in section;

Fig. 4 is a detailed vertical section taken along line 4—4 of Fig. 3;

Fig. 5 is an enlarged vertical section taken along line 5—5 of Fig. 1;

Fig. 6 is an enlarged front view, partly in section;

Fig. 7 is a sectional view of the tools, similar to Fig. 6, but showing the parts in a changed position;

Fig. 8 is a bottom view of the blocker;

Fig. 9 is a section of the blocker taken along line 9—9 of Fig. 8;

Fig. 10 is an enlarged view of a lens element after grinding;

Fig. 11 is an enlarged vertical section of the pressure regulating mechanism;

Fig. 12 is a transverse vertical section taken along line 12—12 of Fig. 11;

Fig. 13 is a similar section taken along line 13—13 of Fig. 11;

Fig. 14 is a similar section taken along line 14—14 of Fig. 11;

Fig. 15 is a plan section taken along line 15—15 of Fig. 14;

Fig. 16 is a vertical section taken along line 16—16 of Fig. 14;

Fig. 17 is a largely diagrammatic plan view of the apparatus modified in certain particulars for purpose of clarification;

Fig. 18 is a similar front view, taken along line 18—18 of Fig. 17;

Fig. 19 is a similar side sectional elevation taken substantially along line 19—19 of Fig. 17, these figures 17–19 illustrating the general operation of the machine;

Figs. 20–22 and 23–25 are diagrammatical sectional elevations taken through the upper and lower tools to illustrate the nature of the grinding operation as applied to concave and convex lenses respectively;

Fig. 26 is an electrical diagram showing the control means of the embodiment shown in Figs. 1–16, and Figs. 27 and 28 are sections similar to Figs. 23, and showing modifications thereof.

The general operation of the machine will be described first in connection with Figs. 17–19. The machine illustrated comprises three separate mechanisms, the spindle mechanism, the rock shaft mechanism, and the pressure regulating mechanism. These three mechanisms may be independently driven, subject to common control, or may be driven in timed relationship to each other.

The spindle mechanism comprises a vertical spindle 25 which supports a lower tool 26 by means of a suitable chuck or other connecting means 27, here shown as a taper fit. The spindle 25 may be driven by a suitable motor not shown.

Through analogy to the lapping art in which both the blocker and the lap are referred to generically as tools, the term "tool" or "element" in the present instance is used as referring generically to the blocker, and to the grinding wheel. In grinding a convex lens, the blocker comprises the lower tool, and the wheel the upper tool, whereas in grinding a concave lens, the wheel comprises the lower tool and the blocker the upper tool. In other words, the term "lower tool" is used herein to always refer to the convex tool, and the term "upper tool" always refers to the concave tool, irrespective of actual orientation.

The rock shaft mechanism comprises a horizontal rock shaft 28 journalled in a suitable bearing 29. Drive means designated generally by the reference numeral 30 are provided for oscillating the rock shaft 28. The drive means shown may comprise a crank 31 driven by shaft 32 and connected by a link 33 to a lever 34 on the rock shaft.

The rock shaft is provided with an arm 35 which carries a pneumatic cylinder 36 having a piston 37. The lower end of the piston terminates in a ball pin 38 which is received within a suitable socket in the upper tool 39, the upper and lower tools 39 and 26 being in cooperative engagement, as pointed out above. Thus, rotation of the shaft 32 causes the cylinder 36 and hence the upper tool 39 to oscillate back and forth over the lower tool 26. A series of holes 40 are provided in the lever 34 to regulate the amplitude of oscillation, and a screw-threaded connection 42 is provided between the two halves of the link 33 so as to regulate that which is termed herein as the "average displacement." This term refers to midway point between the extremes of oscillation and is to be distinguished from instantaneous displacement.

The spindle 25 and the rock shaft 28 are so located, that the axes of each, 43 and 44, respectively, are, within manufacturing tolerances, disposed in the same plane and perpendicular to each other.

The pressure regulating mechanism includes a pressure regulator 50 and actuating means 60. The pressure regulator may be of any standard type and includes an inlet 51 connected to a supply line, and an outlet 52 which is connected by the line 53 to a nipple 54 on the feed side of the cylinder 36. The pressure regulator also includes the usual diaphragm 55, a loading spring 56, and a regulating stem 57 which is screw-threaded into the casing 58. Thus, rotation of the stem 57 will regulate the pressure within the cylinder 36 and hence the thrust on the upper tool 39.

The actuating means 60 serves to regulate the pressure during each cycle of operation to the end that the thrust on upper tool 39 may increase from a minimum to a maximum during each cycle of operation.

The actuating means comprises a crank 61 mounted on a shaft 62 and connected by a link 63 to a lever 64 which is carried by the stem 57. Suitable means are provided to drive the shaft 62 in timed relationship with the shaft 32, but at a different rate of speed, so that the desired pressure regulation may be obtained.

The broad outlines of the operation having been described in connection with the diagrammatic Figs. 17–19, the nature of the grinding operation will next be described in connection with Figs. 20–25, and lastly the details of the mechanism will be described in connection with Figs. 1–16 and 26. In some particulars the mechanism indicated in the diagrammatic figures has been modified for purposes of illustration so that details of the several parts do not agree in all particulars with the diagrammatic view.

In Figs. 20–22, which illustrate the grinding operation as applied to concave lenses, the upper tool 39a is the blocker, and the lower tool 26a is the grinding wheel. The blocker is provided with a socket 66 to receive the ball 38 of the piston 37, thus providing a universal ball and socket type of connection for transmitting the thrust of the piston 37 to the upper tool 39a.

The wheel 26a has a surface 70 which is spherical with respect to the center point C. The center point C lies in the axis 43 of the spindle 25, and preferably is located at the point of intersection of the axis 43 and the axis 44 of the rock shaft 28. However, as pointed out above, the machine tolerances are of a much greater order than the permissible tolerances of lens surfaces, and for this reason the ball and socket joint 38—66 is provided to permit the upper tool 39 to seek its own center with respect to the lower tool 26.

The blocker 39a is a device for holding a plurality of lens blanks 67, the lens blanks being suitably cemented in place in a generally hemispherical configuration. The actual arrangement of the lens blanks, as shown in Figs. 8 and 9, may be considerably different from that shown in Figs. 20–22 in which a given arrangement is assumed primarily for purposes of illustration. Furthermore, the size and thickness of the blanks has been somewhat increased, with respect to the tool radius, for purposes of illustration.

The original blank surface which is exposed for grinding is designated by the reference numeral 68, and the finished surface, indicated by a broken line in Figs. 20 and 21, is designated by the reference numeral 69. The area bounded by lines 68 and 69 represents the amount of glass to be removed by the grinding operation. The finished surface 69 has the identical radius as the wheel surface, as illustrated in Fig. 22, which shows the parts at the conclusion of the grinding operation.

Fig. 20 shows the parts at the start of the grinding operation, with the tools in neutral position, and Fig. 21 shows the parts at the beginning of the operation in a displaced position. It will be seen that at the beginning of the grinding operation, contact is made between the surfaces 70 and 68 in such a manner that there is a substantial space 71 between the surfaces 70 and 69, the width of this space representing the amount of feed required during the course of the grinding operation.

The grinding of a convex lens is diagrammatically illustrated in Figs 23–25, in which the reference numeral 39b designates the wheel which is provided with a socket 72, and the reference numeral 26b designates the blocker. The lens blanks 73 are suitably cemented to the blocker. The reference numeral 74 designates the original surfaces of the lens blanks 73; the reference numeral 75 designates the broken line defining the finished surface; and the reference numeral 76 designates the wheel surface. The wheel 39b is a diamond grit wheel, the same as the wheel 26a. The wheel surface 76 is a spherical surface.

In actual practice, the spherical surface 76 of the wheel 39b may extend down to the 80° line as shown in Fig. 28. Also, the lens blanks 73 on the blocker 26b may be blocked to a point substantially below the equator or 90° line, as shown in Fig. 27.

The three variables in any grinding operation are the speed, the grinding pressure, and the grit. According to the present invention, the grit is determined by the wheel 26a, which is preferably a diamond grit wheel, the grit being of suitable fineness, and being embedded in a matrix of cast iron or the like.

In the case of large wheels, the wheel may be grooved for the coolant, or the grit may be in the form of buttons embedded in the body of the wheel.

The grinding speed is the differential speed between the upper and lower tools, and of course this varies in accordance with instantaneous displacement, and with respect to the latitude of the various surface elements.

The lower tool is driven at a relatively high speed, say from 1000 to 4000 r.p.m. for a one inch blocker. The upper tool rotates freely with the lower tool, due to the ball and socket joint. Therefore, when the parts are in neutral position shown in Fig. 20, assuming no inertia, the differential speed will be zero.

However, when the upper tool is displaced, as shown in Fig. 21, there will be substantial differential speed in view of the fact that the linear speed of the lower tool at point 70' is considerably less than the linear speed at point 70''. Therefore, there will be a slippage at one or both points, and this slippage represents the differential speed.

In explaining the grinding pressure, it is desirable to distinguish between applied thrust which is the total thrust exerted by the piston 37 on the upper tool 39, unit thrust which is thrust per unit of contact area, and unit pressure which is pressure per unit of contact area, or the grinding pressure.

It is also desirable to distinguish between initial grinding and the intermediate and final stages of the grinding operation.

As the grinding operation progresses, the contact area increases. Therefore, unit thrust decreases. In the initial grinding stage, the contact area is relatively small, as shown in Figs. 21 and 24, with the result that unit thrust is relatively high.

One feature of the present invention is that the applied thrust may be first increased substantially in magnitude during the course of the grinding operation to partially offset the decrease in unit thrust, and then decreased to provide a "spark-out period." This variation in magnitude of thrust is provided by the pressure regulating means 50—60 referred to above.

As pointed out above, oscillation of the upper element is necessary in order to develop differential speed. Furthermore, oscillation serves to distribute the wear of the wheel substantially uniformly over the entire spherical surface with the result that life of the wheels used in accordance with our invention have proved to be exceptionally long. The method of grinding herein described does not provide any repeating patterns which give rise to zoning or scratches in the lens surface, since the differential motion provided is entirely random.

With reference now to the detailed drawings of the preferred embodiment of our invention which appear in Figs. 1–16, the reference numeral 85 designates a suitable framework on which the various elements are mounted. As shown in Fig. 2 the framework includes a horizontal portion 86 which may serve as a work table. A suitable coolant supply device and a shield, not shown, may be located on the table 86. The spindle 25 is suitably driven from motor 87 by means of a pulley and belt drive 88.

The chuck 27 includes a sleeve 89 which is threaded onto the spindle 25 so that the spherical center C may be brought into alignment with the axis 44 of the rock shaft 28 as nearly as possible. A suitable jam nut 89a serves to lock the parts in their adjusted position.

The drive means 30, as shown in Figs. 1 and 3, comprises a double acting pneumatic cylinder 90 which may desirably have suitable hydraulic controls, of dashpot type, not shown. The cylinder 90 actuates a reciprocating piston 91. A rack 92, also shown in Fig. 6, is connected to the piston 91 and engages a pinion 93 secured to the rock shaft 28, with the result that the rock shaft is oscillated back and forth by the piston 91. A guide 94 engages the upper surface of the rack 92 and is mounted on a suitable bracket 95. A suitable screw 96 permits adjustment of the guide 94 and rack 92 to eliminate any backlash which may develop between the rack 92 and pinion 93.

A protractor plate 97 is suitably mounted on the bearing 29 at a point adjacent the arm 35, the latter carrying a pin 98 so that the amplitude of oscillation can be measured in terms of degrees, suitable indicia being provided on the protractor plate 97.

The actuating means 60 is shown in Figs. 14–16. A wheel 100 is mounted at the rear end of shaft 28, and is provided with a diametral T slot in which a slide 101 is mounted. A screw 102 runs the length of the T slot and is suitably secured therein so that the radius of the slide 101 can be adjusted, thereby regulating the throw of a drive pawl 103, which is linked to a projection on the slide 102.

A ratchet wheel 104 is suitably mounted on the valve stem 57 to drive the same, and the ratchet is advanced by means of the drive means 103. A holding pawl 105 is located adjacent the drive pawl 103 and is pivotally mounted on a pin 106, shown in Fig. 15 as being screwed into a suitable bracket member 107 which is supported from the framework 85. A slot 108 is formed in the drive pawl 103 to accommodate the pin 106 and to serve as a guide member for the drive pawl. Thus, oscillation of the disk 100 will cause the ratchet wheel 104 to be advanced one or more teeth at a time.

Means are provided for disengaging the pawls 103 and 105 from the ratchet wheel 104. This means includes a yoke 109 shown in Fig. 16, which carries a spring 110, which urges the pawls downwardly into engagement with the ratchet wheel. The yoke is connected to the armature 111 of a solenoid 112, shown in Figs. 1 and 2. Thus, energization of the solenoid will free the ratchet 104 to return the same to its initial low pressure position.

Means are provided to bias the ratchet 104 and the stem 57 in the direction of low pressure, so that when the ratchet is released, the pressure will drop to the minimum setting. Such means comprises a spring unit 113, shown in Figs. 4, 11 and 13. The spring unit embodies a two-part casing of which one part is a hub member 114 secured by a set screw 115 to the stem 57. The other casing part is an outer shell member 116. A coil spring 117 secured at opposite ends to members 114 and 116, is coiled within the casing. The spring 117 biases the shaft 57 in the counterclockwise direction, as shown in Fig. 13, the outer shell member 106 being anchored against rotation in the clockwise direction by means of anchor arm 118 which engages a suitable bracket 119 shown in Fig. 4. Thus, as soon as the ratchet wheel 104 is released, the stem will automatically be rotated back to minimum pressure setting, all ready for the next cycle of operation.

Means are provided to regulate the minimum pressure setting of the stem 57. This means, as shown in Figs. 11 and 12, comprises a plate bracket 120 suitably mounted on framework 85, and provided with a pivot 121. The stem 57 is provided with a pilot 122 which is received in the pivot 121. A regulating lever 123 mounted on pivot 121 carries a stop pin 125 which is threaded into the lever, and has a reduced portion which extends into one of a series of holes 124 formed in the plate bracket 120. The angular position of the regulating lever 123 is changed by unscrewing the stop pin from the lever, shifting the lever to overlie another hole 124, and then replacing the stop pin 125.

An arm 126 is suitably secured to the stem 57 and located so as to swing into engagement with the stop pin 125 when the ratchet wheel 104 is released. Thus, the minimum pressure setting may be varied in accordance with the requirements of different grinding operations.

Means are provided to control the operation of the pneumatic cylinder 90 which oscillates the rock shaft 28. This means includes a threaded rod 140 which is attached to the end of the rack 92 as shown in Fig. 6. Spaced disks 141 and 142 are adjustably mounted on the rod 140, as by threading, as shown in Fig. 3. Limit switches 143 and 144, respectively, are positioned for engagement by the disks so that the operation of the pneumatic cylinder 90 may be controlled with respect to amplitude of reciprocation. The limit switches 143 and 144 are electrically connected to a suitable reversing valve 145, shown in Fig. 26. Adjustment of the disks 141 and 142 also provides a fine adjustment of the average displacement of the oscillating parts, this fine adjustment supplementing the relatively coarser adjustment which may be effected by shifting the ratchet 82 with respect to the pinion 93.

The machine is caused to operate in timed cycles of operation by means diagrammatically shown in Fig. 26. In that figure the reference numeral 150 designates the line circuit; 165 a spark-out circuit; 151 a control circuit; 152 a motor circuit; and 153 the operating circuit for the pneumatic cylinder 90. The last four circuits are connected in parallel to the line circuit 150.

The control circuit 151 includes a solenoid 154 adapted to actuate a valve 155, a solenoid 156 for actuating a two-way valve 157, and a solenoid 158 for actuating a relay switch 159, all of the above-mentioned solenoids being suitably connected in parallel to each other. The control circuit also includes a timer 160 connected in series with the aforementioned solenoids. The timer 160 maintains the control circuit 151 in open circuit condition for a predetermined length of time; when the timer closes the control circuit, the solenoids 154, 156 and 158 will be energized to perform their respective functions incident to the termination of the cycle of operation.

Energization of solenoid 154 closes the valve 155 located in the air supply line 163 which leads to the pneumatic cylinder 90.

Energization of solenoid 156 operates the two-way valve 157 which is interposed in the air line 53 to reverse the operation of the pneumatic cylinder 36, and thereby disengage the stem 37 from the upper tool 39 to the end that the latter may be removed incident to replacing the blocker.

Energization of solenoid 158 breaks the motor circuit 152, by means of relay switch 159. Preferably, the motor 87 is a brake motor, or the relay 158—159 is a motor plugging relay to the end that the rotation of the lower tool may be immediately discontinued, so as to avoid zoning, due to tool rotation after termination of oscillation.

The motor circuit 152 includes a start button 161 and a holding relay 162 for initiating the operation. The holding relay 162 also operates a starting switch 164 to initiate operation of the timer 160.

The spark out circuit 165 includes a timer 166, and the solenoid 112. The timer 166 is set in advance of the timer 160 so that the stem 57 will be rotated back to its minimum pressure setting a few seconds or less in advance of the termination of the main cycle of operation, thus providing a "spark out" period. Continued operation of the vertical spindle 25 and of the arm 35 until the end of the cycle will therefore be more in the nature of a polishing action rather than a grinding action. A starting switch 167 for the timer 166 is operated by the holding relay 162 so that both timers 160 and 166 will be started at the same time.

Energization of the solenoid 112 raises the yoke 109 to release the ratchet wheel 104 in the manner heretofore pointed out.

Thus, the cycle of operation is initiated by closing start button 161, and it is automatically terminated by the operation of the timer 160. Since there is relatively little variation in the duration of the grinding operation, a single setting of the timers 160 and 165 is sufficient for any given production order.

To summarize the operation which has previously been described in connection with the description of the various parts and sub-assemblies, at the beginning of any grinding operation, the motor 87 is off, and the piston 37 is retracted. The timer 166 is first set for the desired duration of the grinding operation, and the timer 160 set for a somewhat longer period.

Then, assuming a concave lens is to be ground, as shown in Figs. 6–10, the lower tool 26 is first inserted in the chuck 27, and its center C aligned with the axis 44 as closely as possible, by means of the adjusting means 89. Then the upper tool 39, the blocker, is placed over the lower tool 26 with the socket 66 in alignment with the ball pin 38. Then the start button 161 is pushed which advances the piston 37, starts the motor 87, and initiates operation of the other parts of the machine. At the conclusion of the grinding operation, the machine is automatically stopped, and the piston 37 retracted so that the blocker 39 may be removed and replaced by a new one and the operation repeated.

At the beginning of any production order, the first few lenses are tested so that the spark-out period may be regulated by adjustment of the timer 166 to provide a lens of the desired thickness, and to insure that the finished surface has been reached.

In grinding convex lenses, the operation is the same, except that the lower tool 26b, which is the blocker, must be replaced during each operation.

The lenses are ground with a non-repeating pattern to a true spherical surface, within the customary tolerances, and this is accomplished irrespective of any slight misalignment of the axes 43 and 44.

By providing a centripetal thrust on the upper tool, the initial grinding pressure may be kept to a magnitude which will avoid cracking or edge chipping. By increasing the applied thrust as the contact area increases, by means of the pressure regulator 50 and the actuating means 60, it is possible to maintain the grinding pressure at an efficient value to the end that the grinding operation may be completed in a relatively short time, such as 10 seconds, or even less.

The use of the pneumatic cylinder 90, as a drive means for the rock shaft 28, is considered to be preferable to the crank and link arrangement of Fig. 17 for the reason that the harmonic motion provided by the latter is more likely to produce zoning than is the substantially constant rate of movement which is produced by the former.

It will be understood that various modifications and changes may be made in the method and apparatus shown herein without departing from the spirit of this invention as pointed out by the appended claims.

We claim:

1. A lens abrading machine comprising a vertical driven spindle, a convex element mounted on said spindle, first driving means for said spindle, a concave element cooperating with said convex element, one of said elements comprising an abrading tool and the other the work, means including a rock shaft assembly for oscillating said concave element over said convex element, second driving means for oscillating said rock shaft assembly, means for urging said concave element against said convex element, said means comprising a fluid actuated cylinder and piston carried by said rock shaft assembly and engaging said concave element, means providing a controlled source of fluid pressure therefor whereby the grinding pressure can be regulated with respect to spindle speed and duration of the abrading operation to control lens thickness, valve means connected to said source to release the fluid pressure exerted on said piston, means connecting said valve means with said cylinder, control means for terminating the abrading operation, said control means including means for simultaneously rendering both of said driving means inoperative, and means for actuating said valve means so as to permit removal of said concave element from said convex element at the completion of the abrading operation.

2. A lens abrading machine as claimed in claim 1 including means for reducing the magnitude of the thrust exerted by said concave element on said convex element prior to the termination of the abrading operation in order to provide a spark-out period.

3. A lens abrading machine as claimed in claim 1, in which said control means includes a timer for actuating the aforesaid means for simultaneously rendering said driving means inoperative.

4. A lens abrading machine as claimed in claim 1, in which said cylinder and piston is a double acting cylinder and piston and in which said valve means comprises a reversing valve.

5. A lens abrading machine as claimed in claim 1, in which said means providing a controlled source of fluid pressure includes a pressure regulator having a pressure control member, and in which third driving means are provided to regulate the position of said pressure control member in order to provide a variation in fluid pressure during the abrading operation.

6. A lens abrading machine as claimed in claim 5 in which said third driving means advances said pressure control member during the initial portion of the abrading operation to provide a gradual increase in the fluid pressure supplied to said cylinder so that the thrust exerted by said concave element against said convex element may be increased during the course of the grinding operation.

7. A lens abrading machine as claimed in claim 6 which includes a releasable connection between said third driving means and said pressure control member, and means for releasing said releasable connection prior to the operation of said control means so that the fluid pressure supplied to said cylinder will be reduced to its initial value, said pressure control member being biased in the low pressure direction.

8. A lens abrading machine as claimed in claim 1, in which said means providing a controlled source of fluid pressure includes pressure regulating means to reduce the fluid pressure supplied to said cylinder prior to the termination of the abrading operation in order to provide a spark-out period.

9. A lens abrading machine as claimed in claim 1 in which the axis of said rock shaft assembly is located in substantially the same plane as the axis of said spindle and is substantially perpendicular thereto so that the thrust developed by said cylinder and piston will be exerted in a substantially centripetal direction with respect to the spherical center of said convex element, said rock shaft axis intersecting said spindle axis to said spherical center.

10. A lens abrading machine as claimed in claim 9 which includes a ball and socket joint located between said piston and said concave element to permit said concave element to center itself with respect to said spherical center irrespective of slight inaccuracies in the alignment of said axes.

11. A lens abrading machine as claimed in claim 10 which includes chuck means located between said spindle and said convex element for mounting said convex element on said spindle, and a screw threaded connection between said chuck means and said spindle to provide adjusting means so that the spherical center of said convex element may be brought into substantial alignment with said rock shaft axis.

12. A lens abrading machine as claimed in claim 1 in which said second driving means comprises a double acting fluid actuated cylinder and piston, a pinion carried by said rock shaft, a rack carried by said piston and engaging said pinion, control member means actuated by said piston, a pair of limit switches adapted to be engaged alternately by said control member means, and a reversing valve actuated by said limit switches to control the operation of said cylinder and piston.

13. A lens abrading machine as claimed in claim 12 which includes a machine frame, and in which said control member means are adjustably mounted with respect to said rack whereby the amplitude of oscillation of said rock shaft assembly can be regulated, and in which said rock shaft assembly includes a radially extending arm, and a protractor plate mounted on said machine frame adjacent said arm and carrying indicia so that the visual indiciation of the amplitude of oscillation of said rock shaft assembly will facilitate the adjustment of said control member means.

14. A lens abrading machine as claimed in claim 1 in which said second driving means comprises a fluid actuated cylinder and piston arranged to impart substantially uniform angular velocity to said rock shaft assembly.

15. A lens abrading machine as claimed in claim 1 in which said first driving means comprises an electric motor offset from the axis of said spindle, and belt and pulley means connecting said motor and said spindle, and in which said means for simultaneously rendering both of said driving means inoperative includes means operating on the armature shaft of said motor whereby any deflection of said armature shaft incident to the discontinuance of the rotation thereof will not be transmitted to said spindle.

References Cited in the file of this patent

UNITED STATES PATENTS

| | | |
|---|---|---|
| 1,527,045 | Howland | Feb. 17, 1925 |
| 1,827,748 | Holman | Oct. 20, 1931 |
| 2,214,361 | Burroughs | Sept. 10, 1940 |
| 2,332,603 | Ross | Oct. 26, 1943 |
| 2,352,146 | Desenberg | June 20, 1944 |
| 2,371,303 | Liebowitz | Mar. 13, 1945 |
| 2,392,478 | Holman | Jan. 8, 1946 |
| 2,600,815 | Turner | June 17, 1952 |
| 2,629,975 | Desenberg | Mar. 3, 1953 |
| 2,643,492 | Burroughs | June 30, 1953 |
| 2,704,424 | D'Avaucourt | Mar. 22, 1955 |
| 2,713,234 | Hill | July 19, 1955 |

FOREIGN PATENTS

| | | |
|---|---|---|
| 714,033 | Great Britain | Aug. 18, 1954 |